United States Patent [19]
Hirao et al.

[11] Patent Number: 5,381,885
[45] Date of Patent: Jan. 17, 1995

[54] TROLLEY APPARATUS WITH IMPROVED UNLOADER

[75] Inventors: Toru Hirao; Hideki Sato, both of Hanno, Japan

[73] Assignee: Tsubakimoto Chain Co., Osaka, Japan

[21] Appl. No.: 207,362

[22] Filed: Mar. 7, 1994

[30] Foreign Application Priority Data

Mar. 10, 1993 [JP] Japan .................. 5-015973[U]

[51] Int. Cl.[6] .................................................. B65G 47/34
[52] U.S. Cl. .................................. 198/465.4; 198/680; 414/337
[58] Field of Search .................. 198/465.4, 687.1, 680; 414/337, 389, 391

[56] References Cited

U.S. PATENT DOCUMENTS

| | | | |
|---|---|---|---|
| 3,454,148 | 7/1969 | Harrison | 198/465.4 |
| 3,499,518 | 3/1970 | Goodpaster | 198/465.4 |
| 3,580,378 | 5/1971 | Pedersen | 198/465.4 |
| 3,710,711 | 1/1973 | Boehm et al. | 198/465.4 |
| 4,903,819 | 2/1990 | Heinold et al. | 198/465.4 |
| 4,936,438 | 6/1990 | Wained | 198/465.4 |
| 4,946,023 | 8/1990 | Heinold et al. | 198/465.4 |

FOREIGN PATENT DOCUMENTS

2043569 10/1980 United Kingdom ............. 198/465.4

OTHER PUBLICATIONS

U.S. patent application 08/214,362—Mar. 16, 1994—Trolley With Improved Transfer Apparatus Hirao et al.
U.S. patent application 08/214,360—Mar. 16, 1994—Automatic Sorting Apparatus—Hirao et al.

*Primary Examiner*—Joseph E. Valenza
*Attorney, Agent, or Firm*—Howson & Howson

[57] ABSTRACT

An unloading apparatus for removing articles on hangers from a trolley comprises a hanger receiving member extending alongside the path of the trolley and movable up and down in an arcuate path following the contour of the hanger support bar of the trolley. The hanger support bar engages the tips of the hanger hooks and lifts the hanger hooks off the hanger support bar of the trolley and deposits them on a hanger chute.

1 Claim, 8 Drawing Sheets

TROLLEY APPARATUS WITH IMPROVED UNLOADER

BRIEF SUMMARY OF THE INVENTION

This invention relates to trolleys for transporting articles, e.g. articles of clothing, on hangers, and relates more particularly to improvements in unloaders for removing articles on hangers from a trolley.

In a conventional unloading apparatus, the unloader comprises a guide plate inclined upward in the direction of travel of the trolley. As the trolley advances, a hook a hanger automatically moves onto the guide plate. The ascending inclination of the guide plate tends to prevent the hook from sliding smoothly along the guide plate. Furthermore, a plurality of adjacent hooks may become entangled with one another. These drawbacks make it difficult to increase unloading efficiency.

The principle object of this invention is to provide an improved unloader which reduces or eliminates the problems of smooth hook travel and tangling of hooks. It is also an object of the invention to provide for improved unloading efficiency in an article-transporting trolley.

In accordance with the invention, an apparatus for transporting articles on hangers comprises a trolley having a horizontally extending, elongated bar engageable by hooks of the hangers whereby a plurality of articles on hangers can be suspended from the bar. Means are provided for moving the bar in a path extending along its direction of elongation. At least one upright stop is provided on the bar for pushing the hook portions of hangers as the bar moves in its path. The unloading apparatus comprises hanger receiving means, extending alongside the bar, and engageable with hooks of hangers suspended from the bar, means for moving the hanger receiving means upward, whereby hooks engaged by the hanger receiving means are raised from the bar, and an unloading chute provided adjacent to the path of the bar for receiving the hooks of hangers raised from the bar by the hanger receiving means, and transporting hangers away from the bar as the hooks are raised from the bar and pushed by the upright stop means, whereby articles on the hangers are smoothly unloaded from the bar onto the chute. In a preferred version, the hanger receiving means is guided in an arcuate path so that the hooks are carried upward and then at least partly over the top of the elongated bar, so that they more smoothly engage the unloading chute.

Further objects, details and advantages of the invention will be apparent from the following detailed description, when read in conjunction with the drawings.

DETAILED DESCRIPTION

Figure 8:
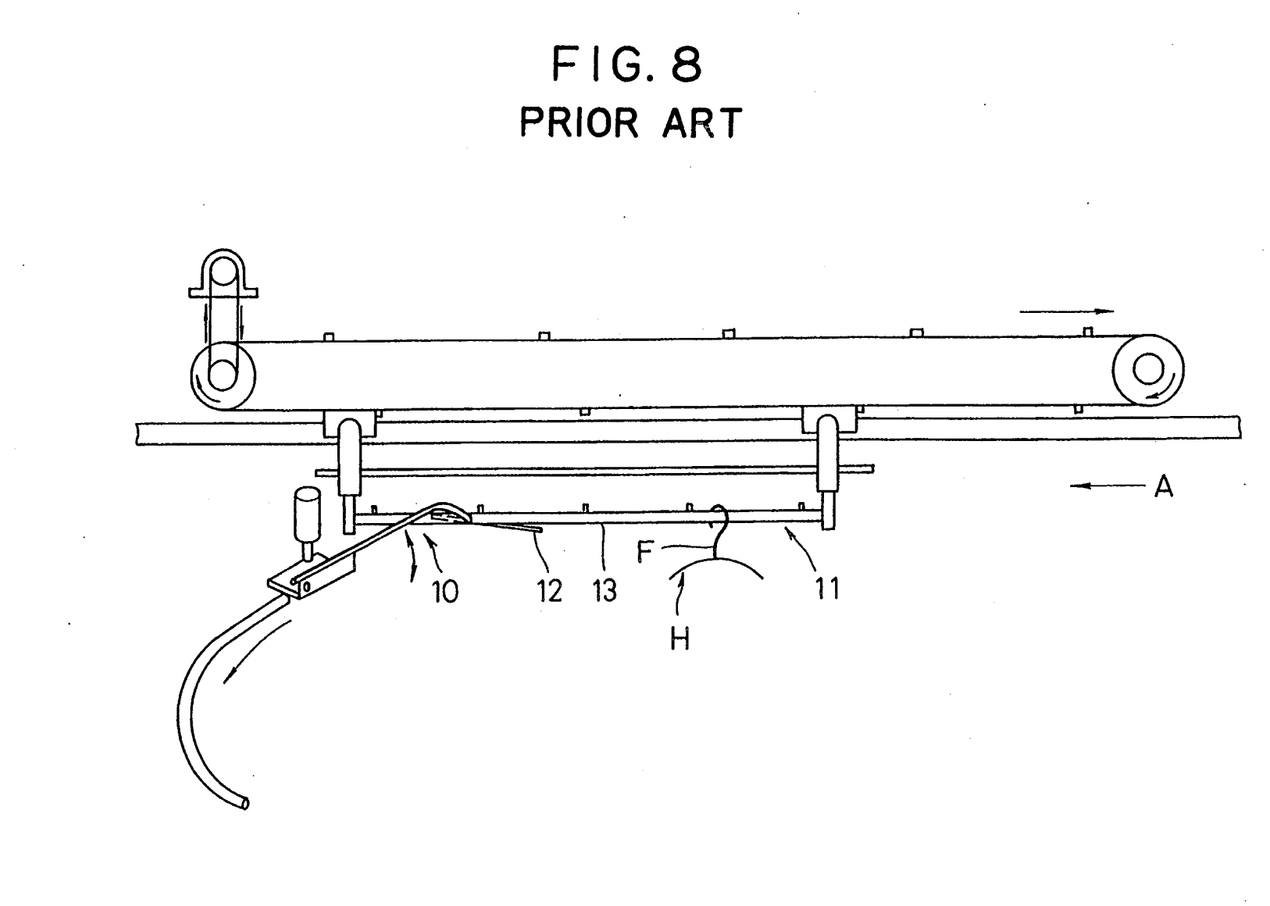
FIG. 8 is a front view of an unloading apparatus of the prior art.

FIG. 8 shows a conventional unloading apparatus as shown and described in Japanese laid-open Utility Model application Ser. No. 60928/1992. The apparatus comprises a guide plate 12 which is inclined upward in the direction of travel of a trolley 11. A hook F of a hanger, engaged with the trolley bar 13, automatically moves onto the guide plate 12, so that the guide plate unloads articles H hung from the bar as the trolley 11 advances. The ascending inclination of the guide plate 12 prevents the hook from sliding smoothly along the guide plate 12. Multiple hooks F may become entangled with one another. These drawbacks limit the unloading efficiency of the apparatus.

Figure 1:
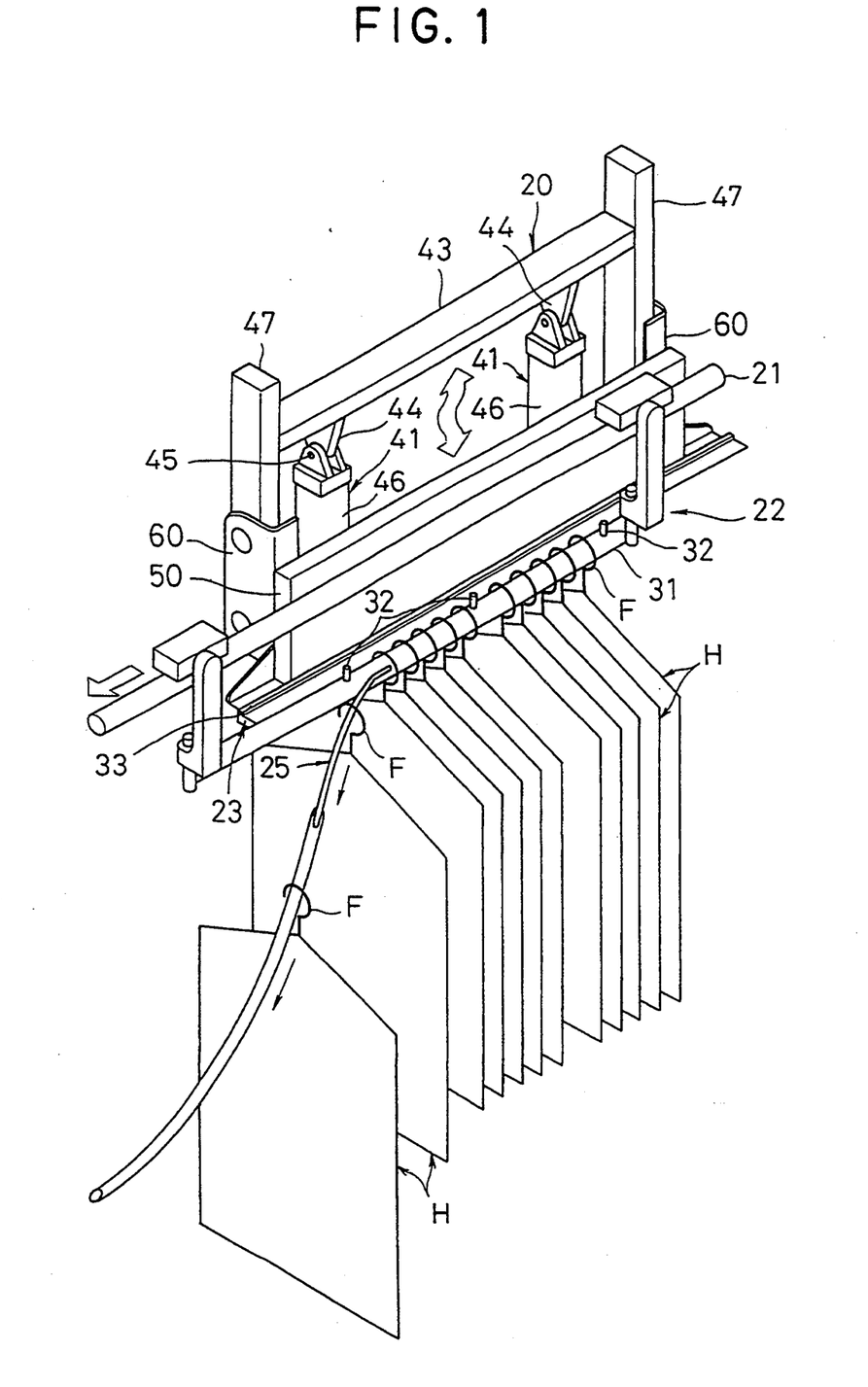
FIG. 1 is a perspective view showing a portion of a trolley rail, a trolley, and an unloading apparatus in accordance with the invention, and illustrating the unloading of an article on a hanger.

The improved unloading apparatus in accordance with the invention is illustrated in FIGS. 1-7. The unloading apparatus 20 as shown in FIG. 1 automatically unloads articles H hung from a trolley 22 traveling along a rail. The articles H are hung from a horizontal bar 31 of the trolley 22, the bar extending in the direction of trolley movement.

Figure 2:
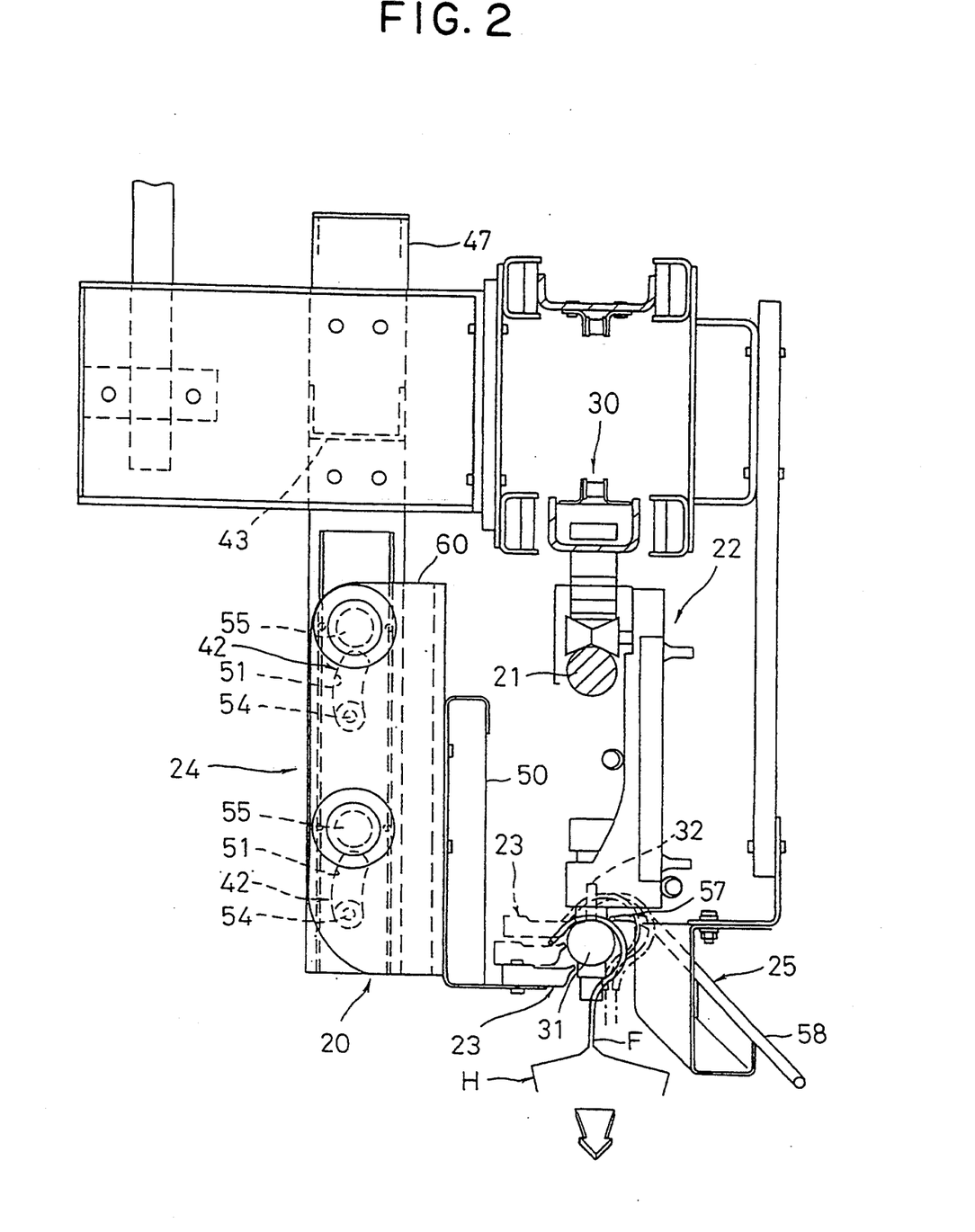
FIG. 2 is a cross-sectional view of the unloading apparatus, as seen from the left-hand side of FIG. 1.

The principal parts of the unloading apparatus 20 are a hanger receiving member 23, a lifting mechanism 24 as shown in FIG. 2, and a hanger chute 25.

The trolley 22 travels on a rail 21 and is driven by a horizontally extending chain 30 shown in FIG. 2. The chain is driven in a closed loop. The rail 21 is preferably a steel bar having a circular cross section.

Figure 7:
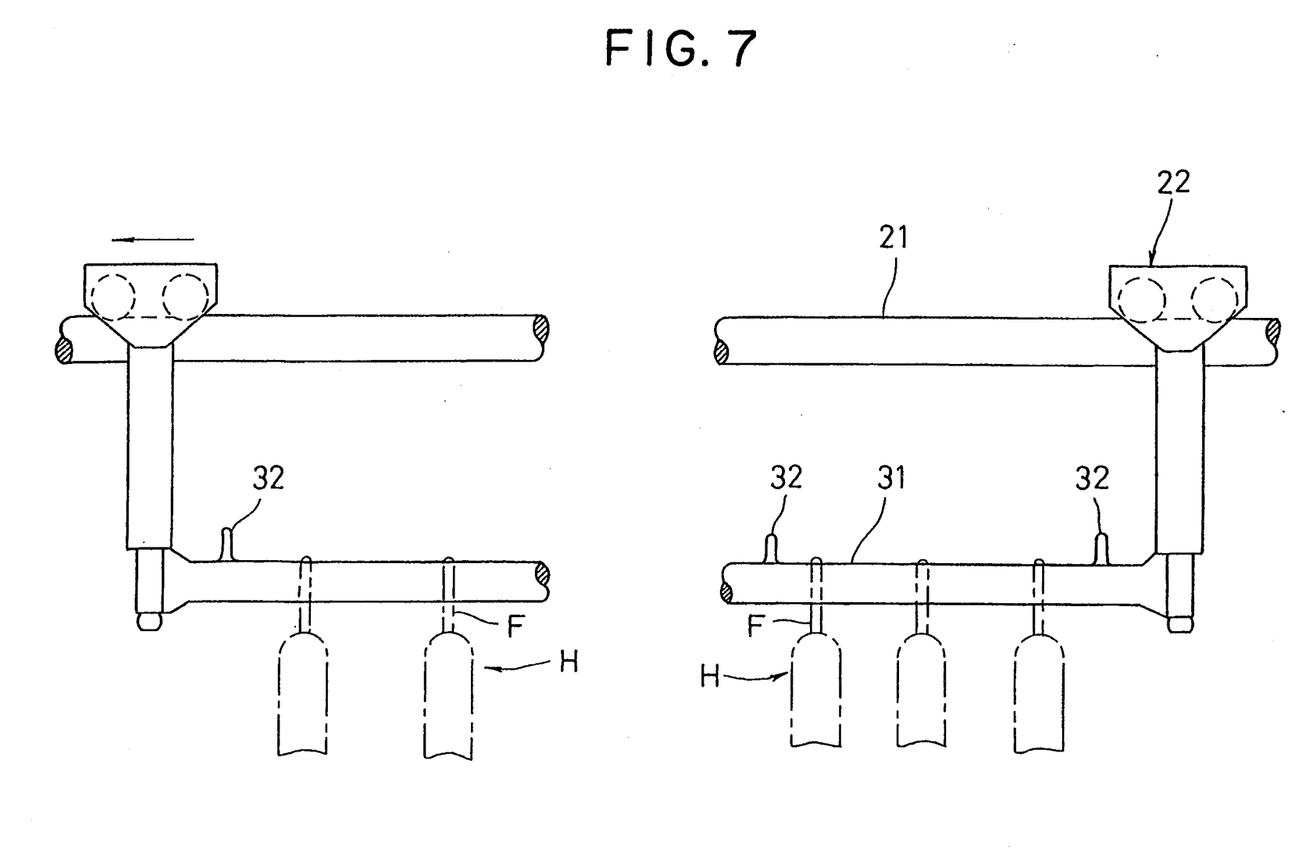
FIG. 7 is partially broken away front elevational view of a trolley.

As shown in FIG. 7, the horizontal bar 31 of the trolley is provided with multiple upright stops 32 at appropriate intervals.

Figure 3:
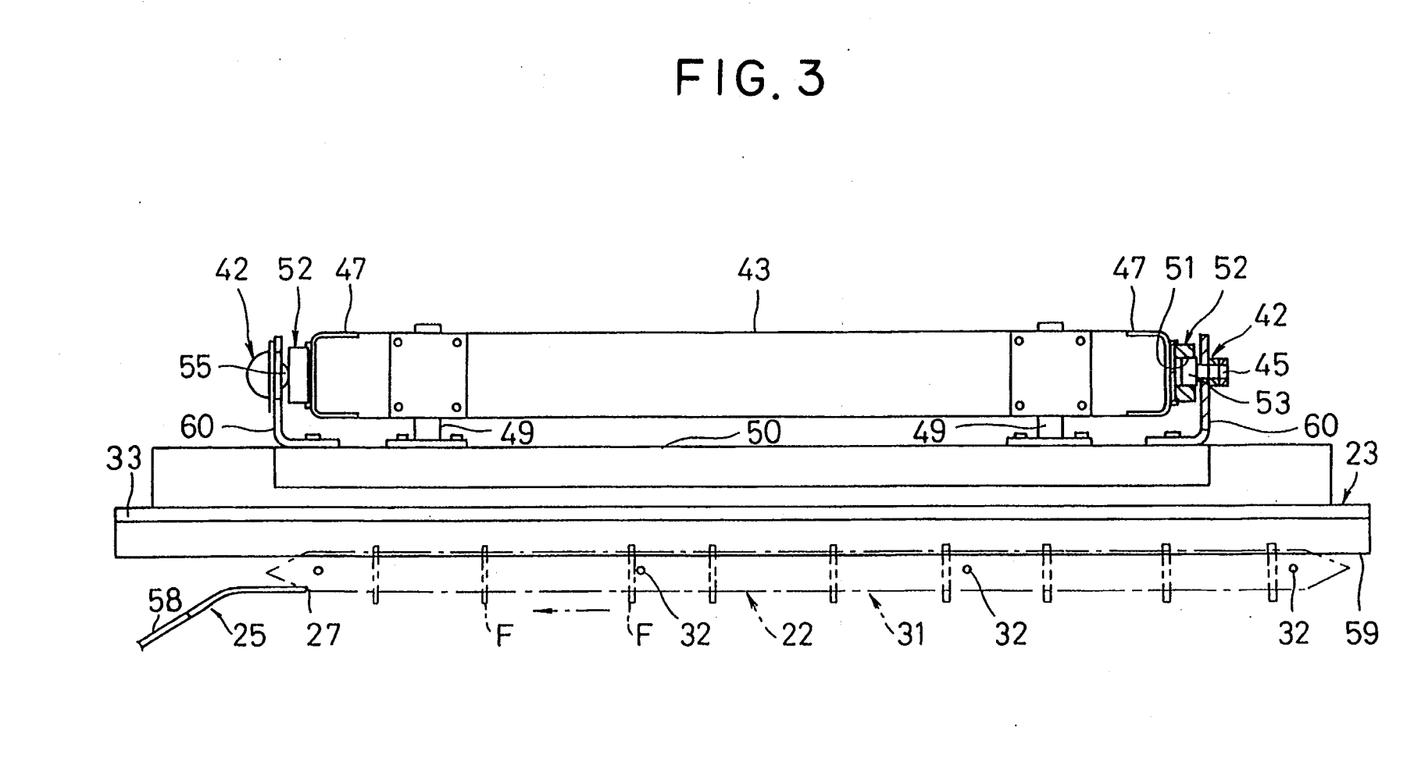
FIG. 3 is a partially broken away top plan view of the unloading apparatus.
Figure 4:
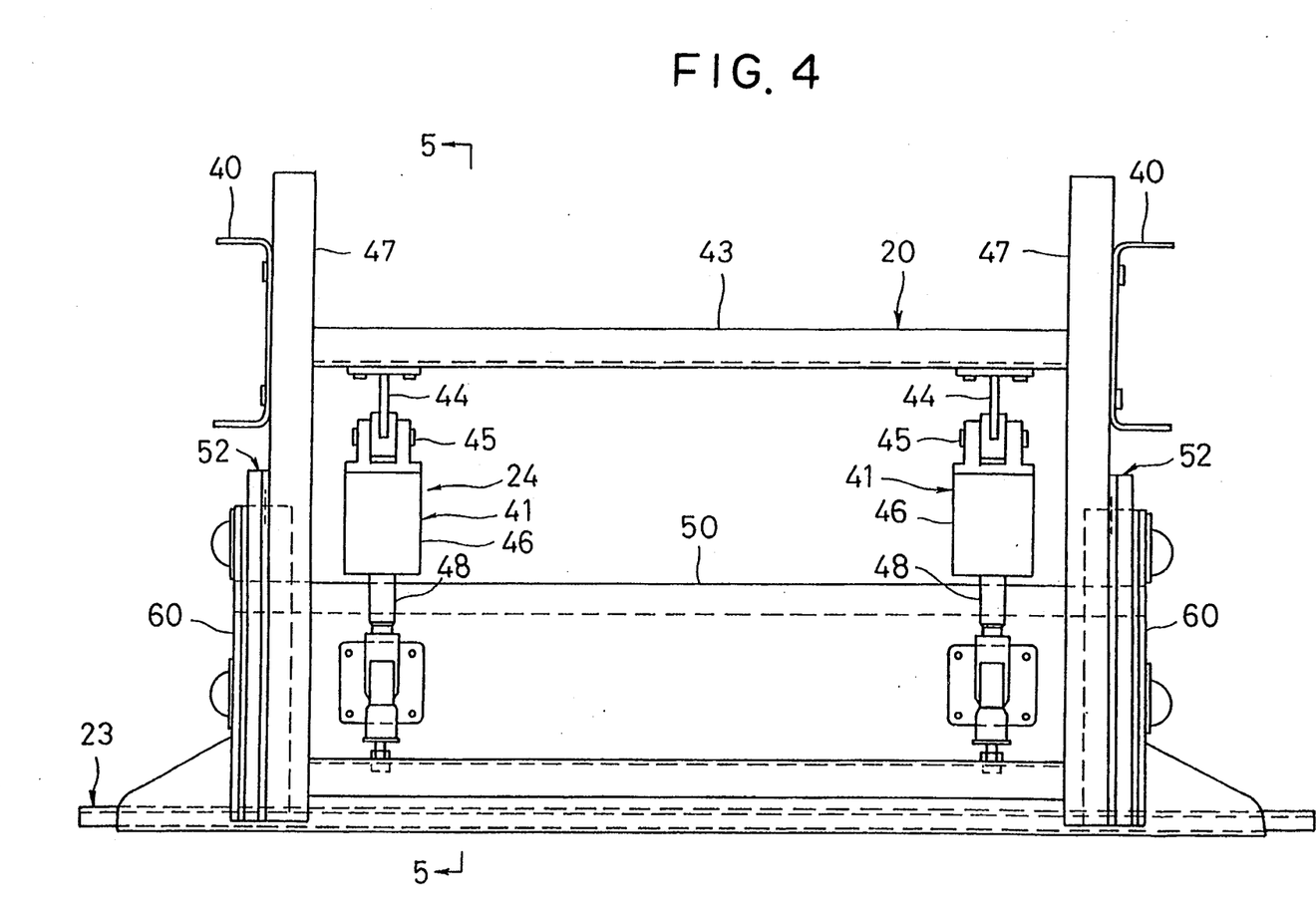
FIG. 4 is an elevational view of the unloading apparatus, as seen from the left side of FIG. 2, with the hanger chute eliminated.
Figure 5:
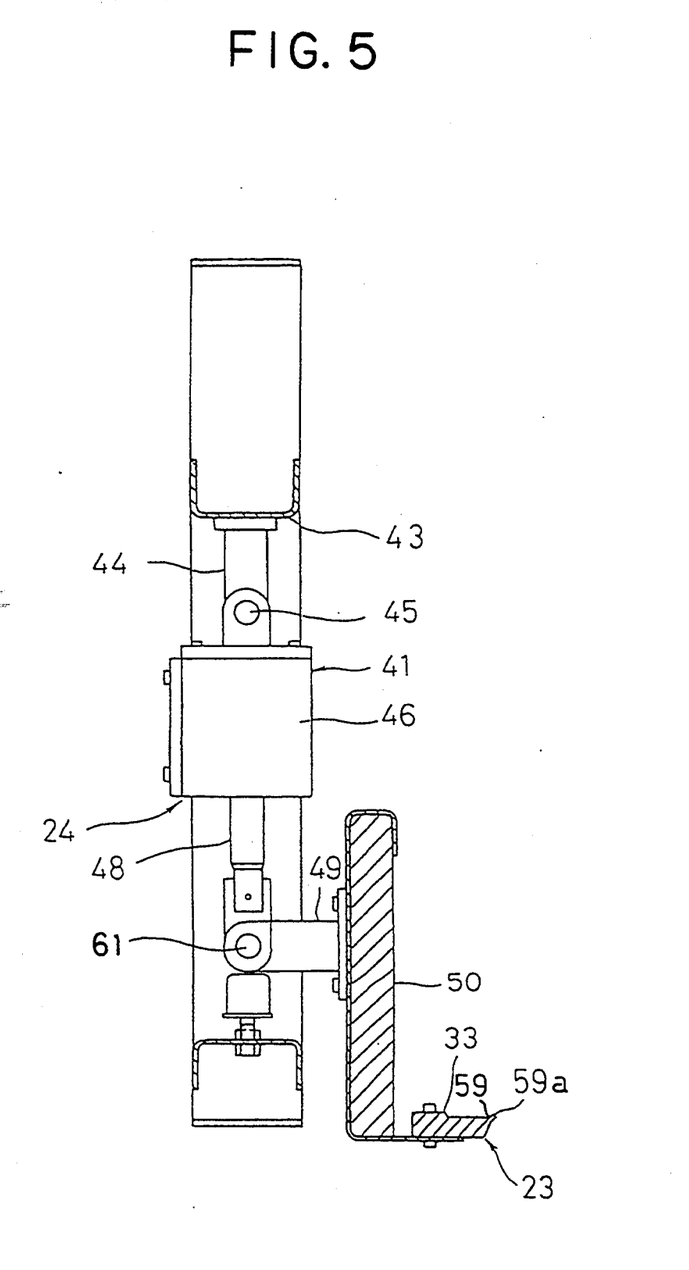
FIG. 5 is a sectional view of the unloading apparatus taken on plane 5—5 of FIG. 4.

The hanger receiving member 23, shown in FIGS. 1-6, is an elongated member, preferably molded from a plastics material. The hanger receiving member extends alongside the path of the horizontal bar 31 of the trolley. A lifting mechanism 24, best seen in FIGS. 2, 4 and 5, is provided to raise and lower the hanger receiving member 23.

A raised strip 33 (see FIGS. 3, 5 and 6) is provided along the rear longitudinal edge of hanger receiving member 23 farthest from the horizontal bar 31 of the trolley. This strip 33 prevents the tip of the hook portion F of a hanger from falling off the rear edge of member 23.

The edge 59 of member 23 extends toward the bar 31 of the trolley. Preferably, a raised strip 59a is formed along front edge 59 to prevent the tip of a hook F of a hanger from falling off the front edge of member 23.

The hanger receiving lifting mechanism 24 is supported on a pair of horizontal beams 40 as shown in FIG. 4. This allows the hanger receiving member 23 to move along an arcuate path, as will be explained in greater detail below.

The lifting mechanism 24 comprises a pair of pneumatic or hydraulic cylinder units 41 along with an arcuate path guiding mechanism 42, as shown in FIGS. 3 and 4.

The cylinder 46 of cylinder unit 41 is tiltably suspended from a bracket 44 by a pin 45, as shown in FIGS. 4 and 5. The bracket 44 is mounted on the lower surface of the intermediate beam 43. The intermediate beam 43 spans a pair of columns 47. The columns 47 are mounted on the opposing surfaces of horizontal beams 40.

A lift frame 50 is suspended from the piston 48 of cylinder unit 41 by a link 49, as shown in FIG. 5, and the hanger receiving member 23 extends horizontally from the lower end of the lift frame 50.

Figure 6:
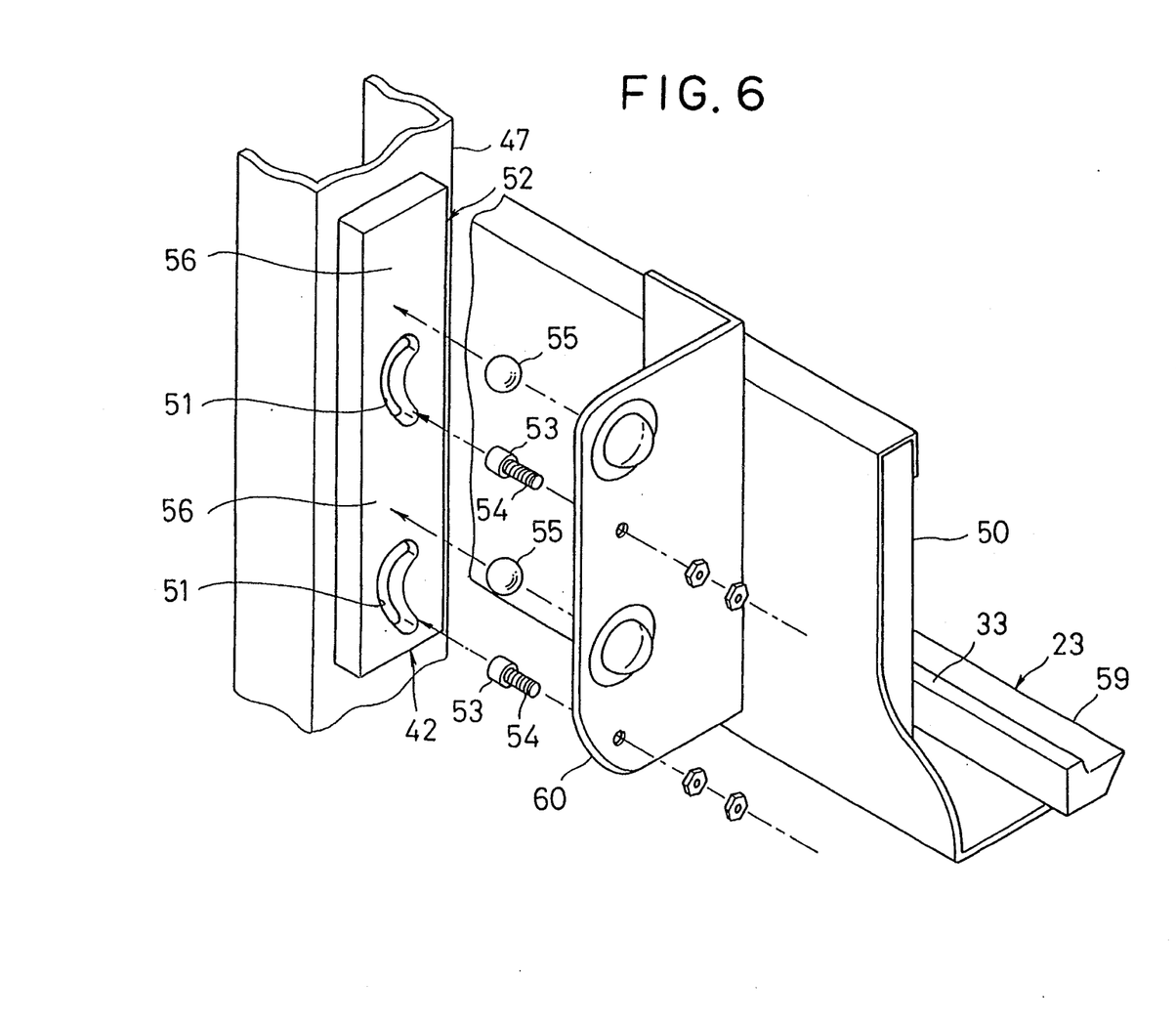
FIG. 6 is an exploded view of an arcuate motion guide mechanism for guiding the path of movement of the hanger receiving means.

An arcuate path guiding mechanism 42 is provided between each bracket 60 and an adjacent column 47, as shown in FIGS. 2 and 6.

The arcuate path guiding mechanism 42 comprises a cam plate 52 provided with a pair of arcuate slots 51 and secured onto a column 47. A pair of guide pins 54, having roller portions 53, are secured to bracket 60. The roller portions are inserted into slots 51. A pair of balls 55, captive in the bracket 60, roll on the flat face 56 of the cam plate 52.

The hanger chute 25 has a sloping base portion 58 and extends upwardly toward the path of the trolley bar 31, as shown in FIGS. 1 and 2. The free end 57 of the hanger chute 25 is bent and extends in a horizontal direction slightly above the bar 31. The free end 57 is tapered at its tip so it can engage the hook portions F of hangers supporting articles H. The free end 57 is disposed so as to not engage stops 32 on bar 31.

In the operation of the unloading apparatus just described, when a trolley, loaded with articles H on hangers, arrives at the unloading location depicted in FIG. 1, the hanger receiving member 23 is raised.

The hanger receiving member 23 is lifted along with the bracket 60 by the fluid-driven cylinder units 41.

As brackets 60 rise, they follow an arcuate path determined by the movement of the roller portions 53 of guide pins 54 in arcuate slots 51. As the bracket 60 rises in its arcuate path, pins 45 allow the lift frame 50 to tilt relative to the cylinder unit 41. The free end 59 of the hanger receiving member 23 therefore closely follows the contour of bar 31, as shown in FIG. 2.

As the hanger receiving member 23 rises, it engages the tips of the hook portions F of hangers supporting articles H, thereby raising the hooks F from the bar 31. The raised strips 33 and 59a on the hanger receiving member 23 prevent the hooks F from falling off the sides of the hanger receiving member.

The articles H are now suspended from the hanger receiving member 23. As the trolley 22 continues to advance, the hangers are pushed by stops 32 and slide along the hanger receiving member until they are received by the free end 57 of the hanger chute 25. The hangers then slide smoothly onto the hanger chute. Thereafter, the articles are transported along the base portion 58 of the hanger chute by gravity.

The articles hung from, and conveyed along, the trolley are all automatically raised from the bar on the trolley by the hanger receiving member 23 and are transferred smoothly to the hanger chute. This eliminates the need for a guide plate with an ascending slope, provides for smoother operation, and minimizes the risk of hooks becoming entangled. The apparatus in accordance with the invention also makes it possible to unload articles on hangers with increased efficiency.

Various modifications can be made to the apparatus described. For example, various forms of actuators may be used to operate the hanger receiving member. The path of movement of the hanger receiving member can be varied to follow the contour of non-circular hanger supporting bars. Still other modifications can be made to the invention described herein without departing from the scope of the invention as defined in the following claims.

We claim:

1. In an apparatus for transporting articles on hangers, said apparatus comprising a trolley having a horizontally extending, elongated bar engageable by hooks of said hangers whereby a plurality of articles on hangers can be suspended from said bar, means for moving said bar in a path extending along the direction of elongation of the bar, and at least one upright stop means on said bar for pushing hooks of hangers as said bar moves in said path, an unloading apparatus comprising:

hanger receiving means engageable with hooks of hangers suspended from said bar, said hanger receiving means extending alongside said bar;

means for moving said hanger receiving means upward whereby hooks engaged by said hanger receiving means are raised from said bar; and an unloading chute provided adjacent to the path of said bar for receiving the hooks of hangers raised from said bar by said hanger receiving means, and transporting hangers away from said bar as the hooks are raised from said bar and pushed by said upright stop means, whereby articles on said hangers are smoothly unloaded from said bar onto said chute.

* * * * *